United States Patent [19]

Bodde

[11] Patent Number: 4,598,346
[45] Date of Patent: Jul. 1, 1986

[54] SUBMERSIBLE FISHING LIGHT

[76] Inventor: Gerald J. Bodde, R.R. 4, Box 294, St. Joseph, Mo. 64504

[21] Appl. No.: 756,184

[22] Filed: Jul. 18, 1985

[51] Int. Cl.⁴ ............................................. F21V 29/00
[52] U.S. Cl. .................................... 362/267; 362/255; 362/378
[58] Field of Search ................ 362/267, 255, 378, 363

[56] References Cited

U.S. PATENT DOCUMENTS

| | | | |
|---|---|---|---|
| 1,745,901 | 2/1930 | McKay et al. | 362/267 |
| 2,051,175 | 8/1936 | Nightingale | 362/267 |
| 2,770,715 | 11/1956 | Stecher | 362/267 |
| 2,779,866 | 1/1957 | Burlingham | 362/267 |
| 3,005,908 | 10/1961 | Farina | 362/267 |
| 3,502,861 | 3/1970 | Evans | 362/267 |
| 4,190,976 | 3/1980 | Hurt | 362/267 |

*Primary Examiner*—E. Rollins Cross
*Attorney, Agent, or Firm*—Kokjer, Kircher, Bradley, Wharton, Bowman & Johnson

[57] ABSTRACT

A submersible fishing light in which the electrical components are sealed within a water impervious plastic shell. Insulated electrical wires extend into the shell and connect with a socket which receives the base of an incandescent bulb. The base of the bulb is threaded through a lead weight which serves as ballast. The neck of the bulb is sealed to the shell by a compressible sponge ring. A metal wire has hook ends embedded in the lead weight and forms an eye through which the electrical wiring extends. In an alternative embodiment, a protective cage surrounds the bulb and is anchored in place by rods having hook ends embedded in the lead weight.

18 Claims, 3 Drawing Figures

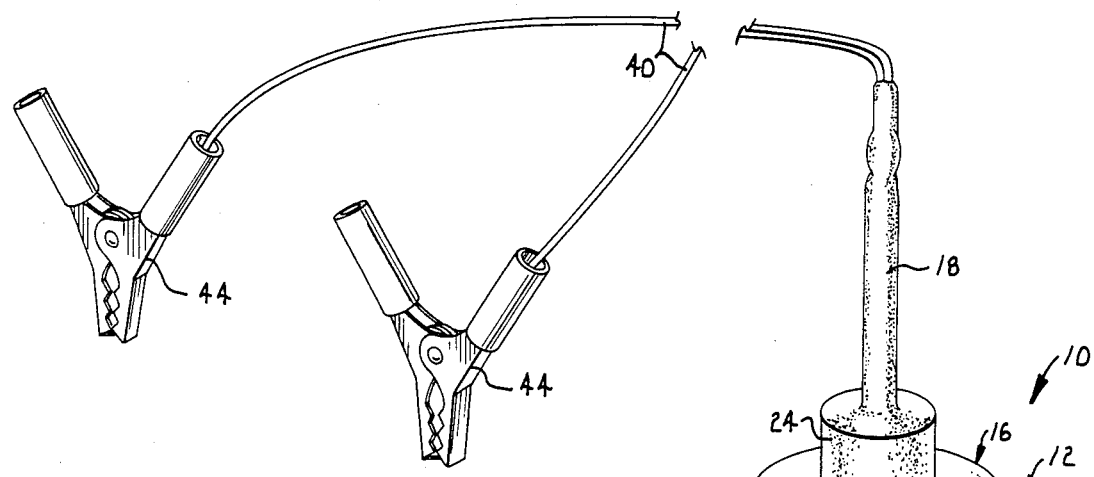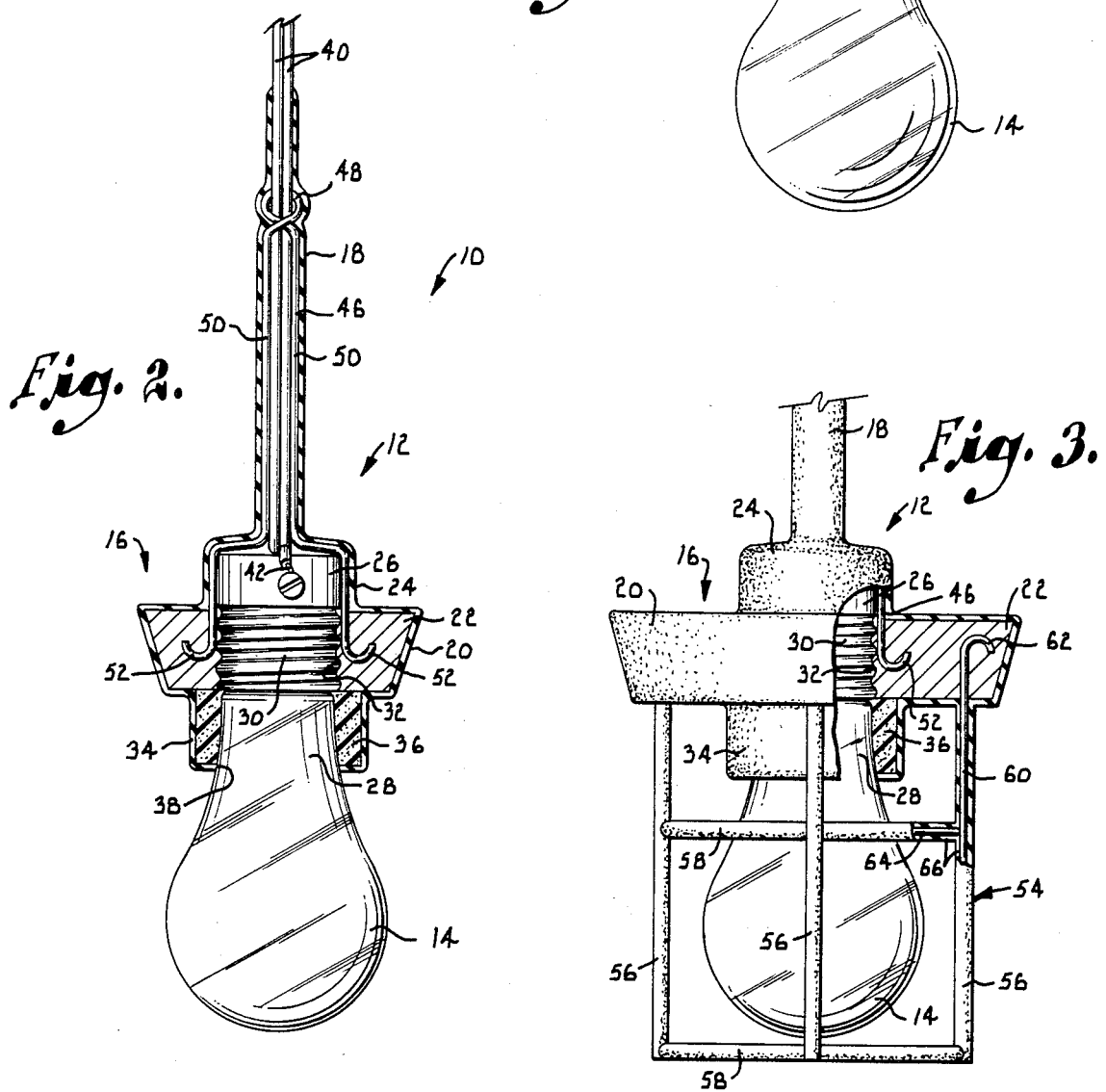

4,598,346

SUBMERSIBLE FISHING LIGHT

BACKGROUND AND SUMMARY OF THE INVENTION

This invention relates in general to lighting devices and more particularly to a light which is specially constructed for use underwater during fishing.

Fisherman have long been aware that fish are attracted to underwater lights. Minnows and other small fish are especially attracted to a submerged light, and larger fish are in turn attracted by the small fish. As a result, underwater lights can be effective in enhancing night fishing.

However, underwater light devices have not been widely used in the past, primarily because the types of lights that have been proposed are plagued by numerous problems. Floating lights such as that shown in U.S. Pat. No. 3,617,733 are not as successful in attracting fish as lights which are submerged well below the surface of the water. The device shown in U.S. Pat. No. 3,510,978 is rather awkward and cumbersome to use because it incorporates a minnow bucket in combination with a light bulb, and the bucket and light must be lowered together into the water. The underwater lights shown in U.S. Pat. Nos. 3,005,908 and 3,502,861 are somewhat more practical but are nevertheless subject to water leakage and other problems.

The present invention is directed to an improved underwater fishing light and has, as its principal object, the provision of a light which is effectively sealed against water leakage. It is a particularly important feature of the invention that the electrical components are encased in a plastic shell which is impervious to water and has a cooperating sponge ring which seals against the neck of the light bulb.

Another object of the invention is to provide a submersible fishing light which is constructed and arranged to be used more easily and to function more effectively than the lights that have been proposed in the past. In this respect, the shell has a unique configuration which allows it to conveniently house the electrical socket, the sponge ring, and a lead weight which serves as ballast to sink the light. At the same time, the shell configuration is compact and gives the light an attractive appearance.

A still further object of the invention is to provide a submersible fishing light in which the electrical wiring is threaded through an elongated neck portion of the shell and through an eye which is formed in a stiff metal wire contained in the shell. This arrangement relieves the strain on the electrical wiring and allows the light to be suspended thereon in the water. Consequently, a separate rope or cable is not necessary for lowering the light into the water, and the simplicity of the device and its ease of use are increased accordingly.

An additional object of the invention is to provide, in a fishing light of the character described, a protective cage for the light bulb which is securely anchored to the shell so that it remains in place for protection of the bulb.

Yet another object of the invention is to provide a fishing light of the character described which is constructed in a simple and economical manner and which uses readily available components.

Other and further objects of the invention, together with the features of novelty appurtenant thereto, will appear in the course of the following description.

DETAILED DESCRIPTION OF THE INVENTION

In the accompanying drawing which forms a part of the specification and is to be read in conjunction therewith and in which like reference numerals are used to indicate like parts in the various views:

FIG. 1 is a perspective view of a submersible fishing light constructed according to a preferred embodiment of the present invention, with the break lines indicating continuous length of the electrical wiring;

FIG. 2 is a sectional view taken through the fishing light on a vertical plane; and FIG. 3 is an elevational view of an alternative embodiment of the fishing light which includes a protective cage, with portions broken away and shown in section for purposes of illustration.

Referring now to the drawing in more detail and initially to FIGS. 1 and 2, numeral 10 generally designates a submersible fishing light constructed in accordance with the present invention. The electrical components of the fishing light 10 are housed within a plastic shell 12 which receives a conventional 12 volt incandescent light bulb 14. The shell 12 has a main body 16 and an elongated tubular neck 18 which extends from the body 16.

As best shown in FIG. 2, the body 16 includes a central cup portion 20 which contains a lead weight 22 serving as ballast to sink the light. The weight 22 is an annular member which fits closely within the cup portion 20. The side wall of the cup portion 20 is frusto-conical.

Located above the cup portion 20 of body 16 is a cylindrical head portion 24 of the body which connects with the neck 18. A conventional electrical socket 26 is contained within the head portion 24. The light bulb 14 includes the usual neck 28 which terminates in a metal base 30 that fits in the socket 26. The lead weight 22 is internally threaded at 32 to mate with the threads on the light bulb base 30. When the bulb is inserted into the socket, electrical connection between the socket and the bulb filament is established in the usual manner.

Body 16 includes a base portion 34 through which the light bulb neck 28 extends when the base 30 is inserted into socket 26. A compressible sponge ring 36 is contained within the base portion 34 and forms a water tight seal between the neck 28 and the shell 12 which houses the electrical components of the light. The neck 28 extends out of shell 12 through an opening 38 formed in the lower end of the base portion 34.

Electrical power is supplied to the light by electrical wiring formed by a pair of insulated electrical wires 40 which extend closely through the top end of neck 18. The wires 40 extend through the entire length of neck 18, and each wire 40 includes a conductor 42 (see FIG. 2) which connects with socket 26 in order to supply electrical power thereto. As shown in FIG. 1, wires 40 connect at their opposite end with terminal connectors 44 which may be clamped to the terminals of a battery (not shown) located within a fishing boat. When the cable connectors 44 are connected to the battery terminals, an electrical circuit is completed from the battery to socket 26 and the light bulb 14. The electrical conductors 42 are preferably 18 gauge copper wire.

A metal wire 46 extends within the neck 18 of shell 12 to stiffen the neck and help it to hold its shape. Wire 46 is bent to form a loop or eye 48 near the top end of neck 18, and the electrical wires 40 are threaded closely through the eye 48. Wire 46 includes a pair of leg portions 50 which extend downwardly from eye 48 within neck 18. The leg portions 50 are bent outwardly around socket 28 and extend through the head portion 24 of the shell and into the cup portion 20. Hooks 52 are formed on the free ends of the leg portions 50, and the hooks 52 are embedded in and hooked to the lead weight 22. The wire 46 is preferably a relatively stiff wire and may be a 14 gauge steel wire.

The shell 12 may be applied in the form of a plastic air dry coating such as the type of coating commercially available under the trademark PLASTI DIP. This type of coating is impervious to water and can be easily applied to encase the components. The metal wire 46 facilitates formation of the neck 18 during application of the coating and provides stiffening for the neck.

In use, the shell 12 and connected bulb 14 are lowered into the water to the desired depth on the electrical wires 40. When the bulb 14 is at the desired depth, the terminal connectors 44 are applied to the opposite battery terminals, and the bulb 14 is then illuminated. Minnows and other small fish are attracted to the energized bulb, and the small fish in turn attract larger fish which may be caught by the fisherman or fishermen using the light 10.

FIG. 3 illustrates an alternative embodiment of the invention which differs from the previously described embodiment only in that the cup 20 and weight 22 are enlarged somewhat, and a protective cage 54 is provided to protect the bulb 14. The cage 54 includes a plurality of vertical bars 56 and a pair of horizontal rings 58 which are connected with the bars 56. Each bar 56 is formed by a metal rod 60 which extends into cup portion 20 and is provided on its top end with a hook 62 embedded in the lead weight 22. The hooked ends 62 of rods 60 securely anchor the cage 54 to shell 12. Each ring 58 includes a wire hoop 64. The rods 60 and hoops 64 are covered by a plastic coating 66 which may be the same type of coating used to form the shell 12.

The embodiment of the invention shown in FIG. 3 is used in substantially the same manner as the embodiment of FIGS. 1 and 2. The protective cage 54 surrounds bulb 14 and protects it against physical damage.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A submersible fishing light comprising:
   a water tight shell;
   a socket in said shell;
   elongate electrical wiring including a pair of electrical conductors connected with said socket at a location within said shell, said wiring extending out of said shell to permit the shell to be lowered thereon into the water and said conductors being adapted for connection with an electrical power source to supply electrical power to said socket;
   an incandescent bulb having a neck extending through said shell and a base received by said socket at a location within the shell to illuminate the bulb when electrical power is supplied to said socket;
   a spongy seal ring in said shell closely surrounding said neck of the bulb to effect a water tight seal between said shell and said neck of the bulb; and
   a weight carried in said shell to serve as ballast for sinking same.

2. The invention of claim 1, wherein said weight comprises an annular member surrounding said base of the bulb.

3. The invention of claim 1, wherein said shell includes:
   a base portion through which said neck of the bulb extends, said seal element being located in said base portion of the shell;
   a cup portion located above said base portion and containing said weight; and
   a head portion located above said cup portion and containing said socket.

4. The invention of claim 3, including:
   an elongate neck portion of said shell extending from said head portion thereof, said neck portion receiving said wiring in extension therethrough; and
   a stiff metal wire extending within said neck portion and bent to form an eye through which said wiring extends, said wire having a pair of hooked ends hooked to said weight.

5. The invention of claim 4, wherein said hooked ends of the wires are embedded in said weight.

6. The invention of claim 1, including:
   an elongate neck portion of said shell, said wiring extending through said neck portion of the shell; and
   a stiff metal wire extending within said neck portion and bent to form an eye through which said wiring extends, said wire having a pair of hooked ends hooked to said weight.

7. The invention of claim 6, wherein said hooked ends are embedded in said weight.

8. The invention of claim 1, including a protective cage substantially surrounding said bulb, said cage including a plurality of rods each having a hooked end hooked to said weight.

9. A submersible fishing light comprising:
   a water tight shell having a main body and an elongate neck extending from said body;
   a socket in said main body of the shell;
   a weight in said main body of the shell serving as ballast to sink the shell;
   elongate electrical wiring extending through said neck and into the main body of the shell, said wiring extending out of said neck of the shell to permit suspension of the shell on the wiring;
   a pair of electrical conductors in said wiring connected with said socket at a location within said shell to supply electrical power to the socket, said conductors being adapted for connection with an electrical power source to supply electrical power to said socket;
   an elongate metal wire extending within said neck of the shell and bent to form an eye in said neck through which said wiring extends, said metal wire having a pair of hooked ends located in said body of the shell and hooked to said weight;

an incandescent bulb having a base received by said socket to illuminate the bulb when electrical power is supplied to said socket, said bulb extending out of said shell; and seal means for sealing said bulb to said shell.

10. The invention of claim 9, wherein said hooked ends are embedded in said weight.

11. The invention of claim 9, including a protective cage substantially surrounding said bulb, said cage including a plurality of rods each having a hooked end hooked to said weight.

12. The invention of claim 11, wherein said hooked ends of said metal wire and said hooked ends of said rods are embedded in said weight.

13. The invention of claim 9, wherein said main body of the shell includes:

a base portion through which said bulb extends, said seal means comprising a compressible seal ring acting to effect a seal between the bulb and said base portion of the shell;

a cup portion located above said base portion, said weight comprising an annular member contained in said cup portion of the shell; and a head portion located between said cup portion and said neck of the shell, said socket being contained in said head portion.

14. A submersible fishing light comprising:
a water tight shell;
a socket in said shell;
a weight carried in said shell to serve as ballast for sinking same;
elongate electrical wiring including a pair of electrical conductors connected with said socket at a location within said shell, said wiring extending out of said shell to permit the shell to be lowered thereon into the water and said conductors being adapted for connection with an electrical power source to supply electrical power to said socket;

an incandescent bulb having a neck extending through said shell and a base received by said socket at a location within the shell to illuminate the bulb when electrical power is supplied to said socket;

seal means for effecting a water tight seal between said shell and said neck of the bulb; and a protective cage substantially surrounding said bulb, said cage including a plurality of generally vertical rods each having a hooked top end hooked to said weight.

15. The invention of claim 14, wherein said hooked top ends of the rods are embedded in said weight.

16. The invention of claim 14, including:

an elongate neck portion of said shell through which said wiring extends; and a stiff metal wire extending within said neck portion of the shell and looped to form an eye in said neck portion through which said wiring extends, said wire having a pair of hooked ends hooked to said weight.

17. The invention of claim 16, wherein said hooked top ends of said rods and said hooked ends of said wire are embedded in said weight.

18. The invention of claim 14, wherein said shell includes:

a base portion through which said neck of the bulb extends, said seal means comprising a compressible seal ring located in said base portion of the shell and sealing against said neck of the bulb;

a cup portion located above said base portion and containing said weight; and a head portion located above said cup portion and containing said socket.

* * * * *